(12) United States Patent
Sonnendorfer et al.

(10) Patent No.: US 8,708,348 B2
(45) Date of Patent: Apr. 29, 2014

(54) SHOPPING TROLLEY

(76) Inventors: Horst Sonnendorfer, Puchheim (DE);
Franz Wieth, Puchheim (DE)

(*) Notice: Subject to any disclaimer, the term of this patent is extended or adjusted under 35 U.S.C. 154(b) by 730 days.

(21) Appl. No.: 12/095,632

(22) PCT Filed: Nov. 30, 2005

(86) PCT No.: PCT/DE2005/002159
§ 371 (c)(1),
(2), (4) Date: Aug. 15, 2008

(87) PCT Pub. No.: WO2007/062613
PCT Pub. Date: Jun. 7, 2007

(65) Prior Publication Data
US 2010/0133768 A1 Jun. 3, 2010

(51) Int. Cl.
*B62B 3/14* (2006.01)
(52) U.S. Cl.
USPC .................. 280/33.992; 280/33.991

(58) Field of Classification Search
USPC ........................................ 280/33.991–33.998
See application file for complete search history.

(56) References Cited

U.S. PATENT DOCUMENTS

| | | | | |
|---|---|---|---|---|
| 4,231,901 A * | 11/1980 | Berbeco | ......................... | 252/511 |
| 4,288,352 A * | 9/1981 | Weiss et al. | .................... | 524/322 |
| 4,720,048 A * | 1/1988 | Maroney et al. | ........... | 280/47.34 |
| 6,357,767 B1 | 3/2002 | O'Quin et al. | | |
| 6,786,559 B1 * | 9/2004 | Kidd et al. | .................... | 301/5.23 |
| 6,964,382 B2 * | 11/2005 | Alexander et al. | ............ | 239/526 |

FOREIGN PATENT DOCUMENTS

DE     20 2004 009 005 U1     11/2005

* cited by examiner

*Primary Examiner* — Katy M Ebner
(74) *Attorney, Agent, or Firm* — Laurence A. Greenberg; Werner H. Stemer; Ralph E. Locher

(57) ABSTRACT

This invention relates to a shopping trolley having castors and a handle, the surface of which consists of plastic. The surface of the handle consists of one or more different materials, at least one of said materials having conductive properties.

8 Claims, 2 Drawing Sheets

SHOPPING TROLLEY

BACKGROUND OF THE INVENTION

Field of the Invention:

The invention relates to a shopping trolley having castors and a handle whose surface comprises plastic.

Electrostatic charging may occur in shopping trolleys of this type.

When pushing a shopping trolley, said shopping trolley may electrostatically charge, depending on the respective ambient conditions.

This may therefore result in the basket of the shopping trolley building up such a high potential that a person who touches this basket receives an electric shock.

Shopping trolleys are known in which the handle tube is sheathed with a poorly conductive plastic, for example soft PVC.

At a certain air humidity, some of the charge can be dissipated by means of this poorly conductive plastic. This has the disadvantage that, especially at a low air humidity, the conductivity of the plastic casing is too low to carry away the charge generated by pushing the shopping trolley.

BRIEF SUMMARY OF THE INVENTION

The object of the invention is to provide a shopping trolley in which the electrostatic charging is avoided independently of the ambient conditions.

This object is achieved by a shopping trolley having castors and a handle with a surface formed of plastic, in which the surface of the handle is formed of different material, of which at least one of the materials has a conductive property.

The subclaims in each case relate to developments and/or particularly advantageous refinements of the invention.

The invention adopts as its own the knowledge that the electrostatic charge is created when a customer holds the trolley by the insulated pushing handle and in the process pushes it. The insulated handle prevents the electrostatic charge which is produced during pushing from being immediately dissipated again by means of the body of the customer in an entirely safe manner.

Building on this knowledge, the invention provides for the pushing handle to be configured such that the pushing handle itself has a sufficiently high conductivity and the pushing handle is conductively connected to the other parts of the shopping trolley.

However, other criteria also come to the fore when selecting the plastics for pushing handles and it has been found that plastics which are electrically conductive are not as optimal as a handle for a shopping trolley in other respects.

The invention therefore makes provision for the handle to use a plurality of materials, of which at least one has a conductive property.

Another development provides for a conductive material, for example graphite, which mixes with the plastic of the handle close to the surface, to be added during production of the handle.

The conductive materials are preferably provided in the region of the handle which is necessarily touched by the customer during pushing.

A small subregion of the handle, preferably at a point which is not directly in the field of view of the customer, suffices for this purpose.

The remaining part of the handle can comprise another material.

DESCRIPTION OF THE INVENTION

Figure 1:
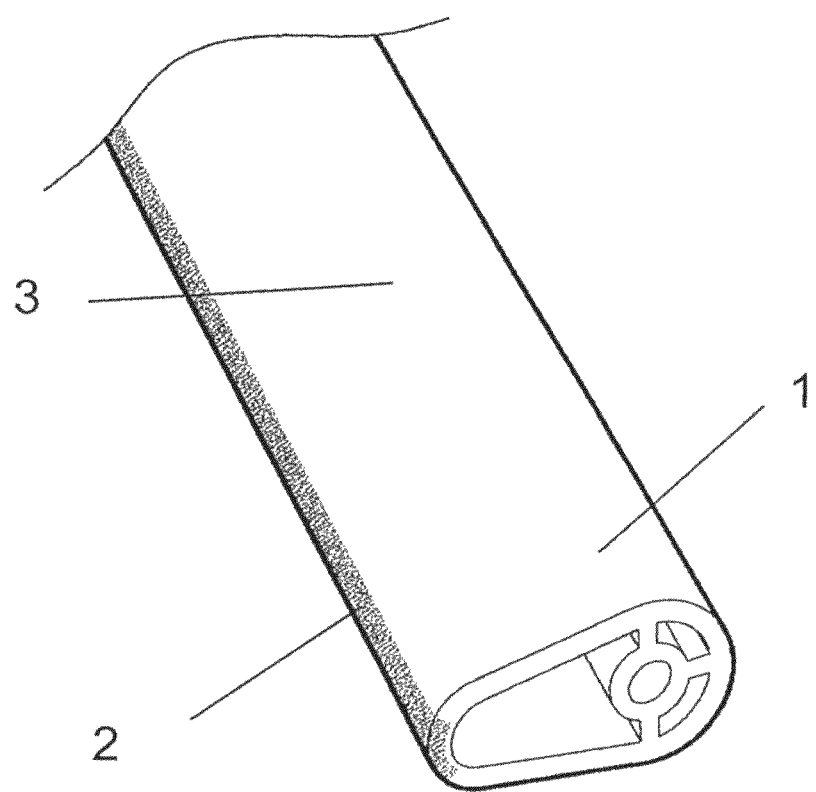
FIG. 1 is a diagrammatic, partly-sectional view of a handle for a shopping trolley according to the invention.

One possible exemplary embodiment of the invention is explained in greater detail below with reference to a drawing:

The handle 1 is shown in FIG. 1 in a partially sectioned illustration.

The handle 1 has a substantial elliptical profile. A region 2 which is electrically conductive runs all the way through the profile; the remaining region 3 is usually produced from another material.

Coextrusion is used to incorporate the conductive material in the injection-molded section from which the handle is obtained, at least at the surface.

The plastic used may be PVC and the conductive material used may be a carbon-containing material or metal particles.

A preferred region for the conductive material is the region of the handle 1 which comes into contact with the balls of the hand and/or thumbs of the customer when the customer pushes the shopping trolley in front of him.

Figure 2:
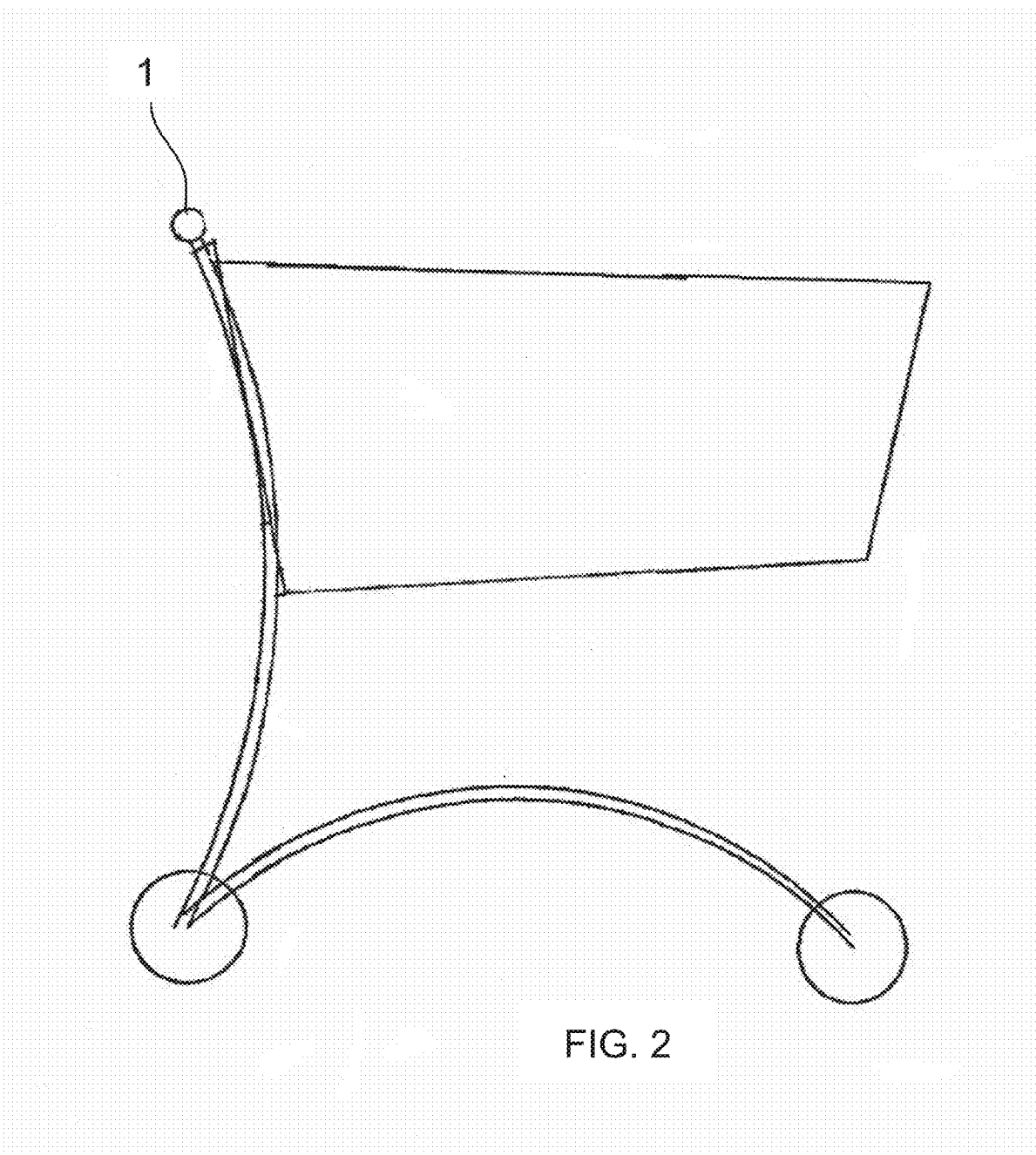
FIG. 2 is a side-elevational view of a shopping trolley having the handle.

Although not shown in the figures, the conductive connection between the handle 1 and the basket shown in FIG. 2 is nevertheless provided.

The invention claimed is:

1. A shopping trolley comprising:
   castors; and
   a one-part handle configured for protecting a person touching the handle against electrostatic charge while shopping for packaged goods, said handle having a surface formed of plastic, said surface of said handle having separate regions being formed of different respective materials, of which at least one of said materials has a conductive property, and said conductive material being disposed in only the region of said handle coming into contact with the balls of the hand and/or thumbs of the person while shopping.

2. The shopping trolley as claimed in claim 1, wherein said conductive material of said handle comprises carbon particles.

3. The shopping trolley as claimed in claim 1, wherein said conductive material of said handle comprises metal particles.

4. The shopping trolley as claimed in claim 1, wherein said at least one material having a conductive property is coextruded in said handle.

5. The shopping trolley as claimed in claim 1, wherein said handle has a profile, and said region formed of said material having a conductive property runs all the way through said profile.

6. The shopping trolley as claimed in claim 1, wherein said handle has a profile, and said region formed of said material having a conductive property is coextruded in and runs all the way through said profile of said handle.

7. A shopping trolley comprising:
   castors; and
   a one-part handle having means for protecting a person touching the handle against electrostatic charge while shopping for packaged goods;

said handle having a surface formed of plastic, said surface of said handle having separate regions being formed of different respective materials, of which at least one of said materials has a conductive property and forms said protecting means, and said conductive material being disposed in only the region of said handle coming into contact with the balls of the hand and/or thumbs of the person while shopping.

8. A method for protecting a person touching a handle of a shopping trolley against electrostatic charge, the method comprising the following steps:

proviing a one-part handle having a surface formed of plastic;

providing the surface of the handle with separate regions formed of different respective materials; and protecting the person touching the handle against electrostatic charge while shopping for packaged goods by providing at least one of the materials with a conductive and placing the conductive material being only in the region of the handle coming into contact with the balls of the hand and/or thumbs of the person while shopping.

\* \* \* \* \*